June 3, 1958   H. D. HUME   2,836,952
CROP CUTTING AND WINDROWING MACHINE
Filed Nov. 26, 1954   7 Sheets-Sheet 3

INVENTOR.
Horace D. Hume
BY Strehl Wells
Atty.

June 3, 1958  H. D. HUME  2,836,952
CROP CUTTING AND WINDROWING MACHINE
Filed Nov. 26, 1954  7 Sheets-Sheet 4

INVENTOR.
Horace D. Hume
BY
Grubb Wells,
Atty.

June 3, 1958　　　　H. D. HUME　　　　2,836,952
CROP CUTTING AND WINDROWING MACHINE
Filed Nov. 26, 1954　　　　　　　　　　　　7 Sheets-Sheet 5

INVENTOR.
Horace D. Hume
BY Ǵreh Wells
Atty.

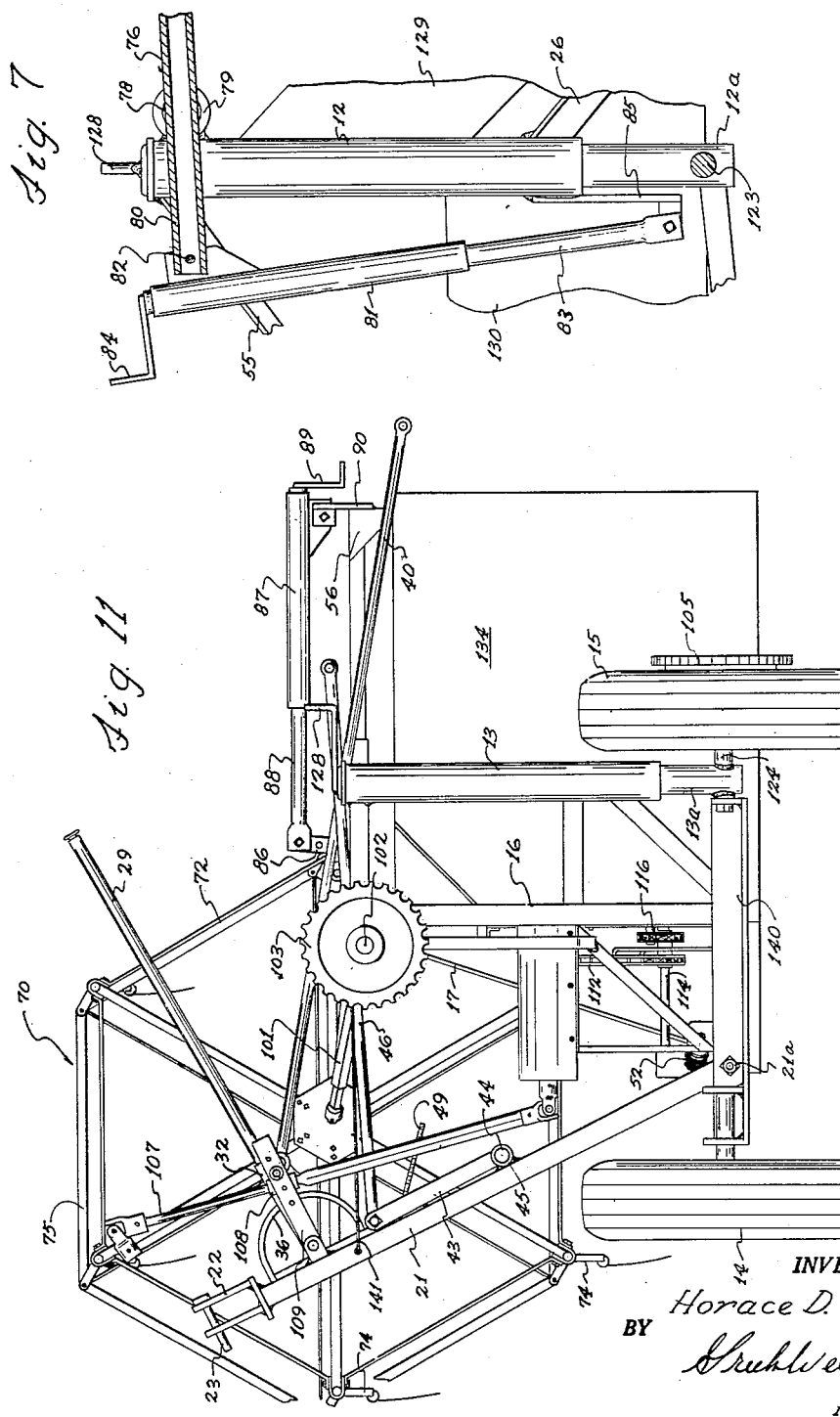

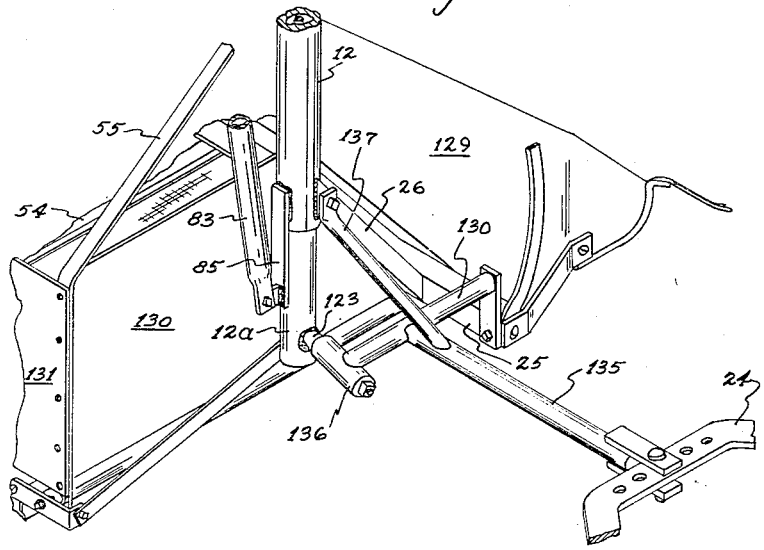
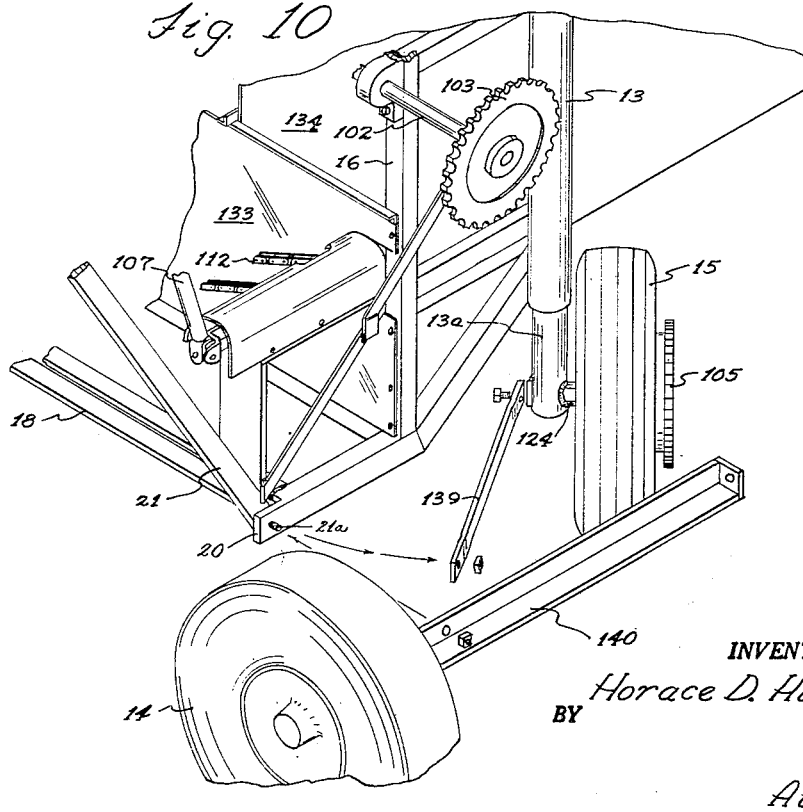

United States Patent Office 2,836,952
Patented June 3, 1958

2,836,952
CROP CUTTING AND WINDROWING MACHINE

Horace D. Hume, Mendota, Ill.

Application November 26, 1954, Serial No. 471,471

6 Claims. (Cl. 56—192)

The present invention relates to improvements in crop cutting and windrowing machines.

In the harvesting of certain field crops, crop cutting and windrowing machines are used. Such machines include a reel, a cutting mechanism, and a transverse conveyor to carry the cut crop to one side of the machine and form the windrow. A tractor or other powered vehicle is used to tow the implement through the field.

It is the principal purpose of my invention to provide a crop cutting and windrowing machine which is simple and light in weight and yet strong enough to meet the requirements of tractor operation, embodying an upright main frame on which the operating parts are mounted in such fashion as to be easily adapted to crop heights and for transport.

A further purpose of my invention is to provide a machine of the character referred to above wherein the height of the cutter bar above the ground may be quickly changed by manipulating a single lever in the framework by which the machine is attached to a tow frame.

A still further purpose of my invention is to provide means on the machine to adapt it to be moved at right angles to the normal direction of travel so that it may be transported along roads and highways without taking more room than other vehicles such as tractors and trucks.

My machine utilizes a vertical main frame from which the various parts are suspended. The vertical main frame is supported at each end by a single wheel. The cutting mechanism is positioned in front of the main frame and at about the level of the wheels. Tilting the main frame about the wheel axles will raise and lower the cutter mechanism. Such tilting of the main frame is accomplished by changing its angular relation to the tow frame of the device which is secured to the towing vehicle. In order that this may be accomplished easily, the main frame is pivotally connected to the tow frame and is counterbalanced against the tow frame so that it may be moved with a minimum of effort.

A reel is supported on the main frame above the cutting mechanism. The reel is attached to supporting arms which pivot about the main frame. Extensible connectors are attached to the arms and to the main frame in such a way that the reel is mounted so it can readily be moved up and down with respect to the cutting mechanism.

A transverse draper is carried by the frame and is positioned behind the cutter bar to receive the cut crop and transport it to one side of the machine where it is dropped to the ground in a window.

The nature and advantages of my invention will appear more fully from the following description and the accompanying drawings wherein a preferred form of the invention is shown. It should be understood, however, that the drawings and description are illustrative only and are not intended to limit the invention except insofar as it is limited by the claims.

In the drawings:

Figure 7 is an enlarged fragmentary sectional view taken on the line 7—7 of Figure 1;

Figure 8 is an enlarged fragmentary sectional view illustrating the depth control lever construction taken on the line 8—8 of Figure 2;

Figure 9 is a fragmentary perspective view illustrating the manner in which a tow bar is connected to the machine for road travel;

Figure 10 is a fragmentary perspective view illustrating the method by which the wheels of the machine are adjusted for road travel; and Figure 11 is an elevation view of the rear end of the machine when it is adjusted for road travel.

Figure 1:
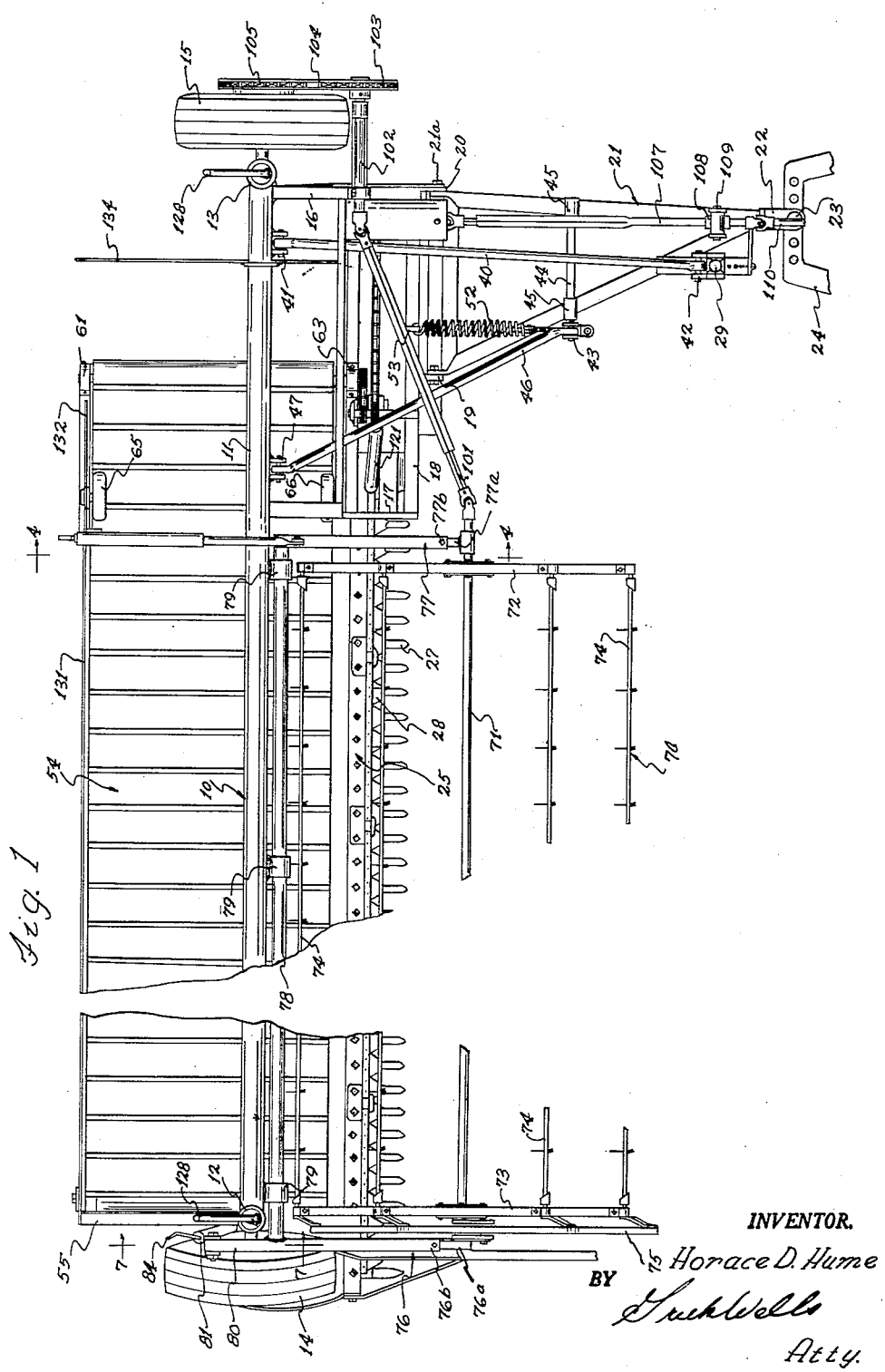
Figure 1 is a plan view of my improved cutting and windrowing machine.
Figure 2:
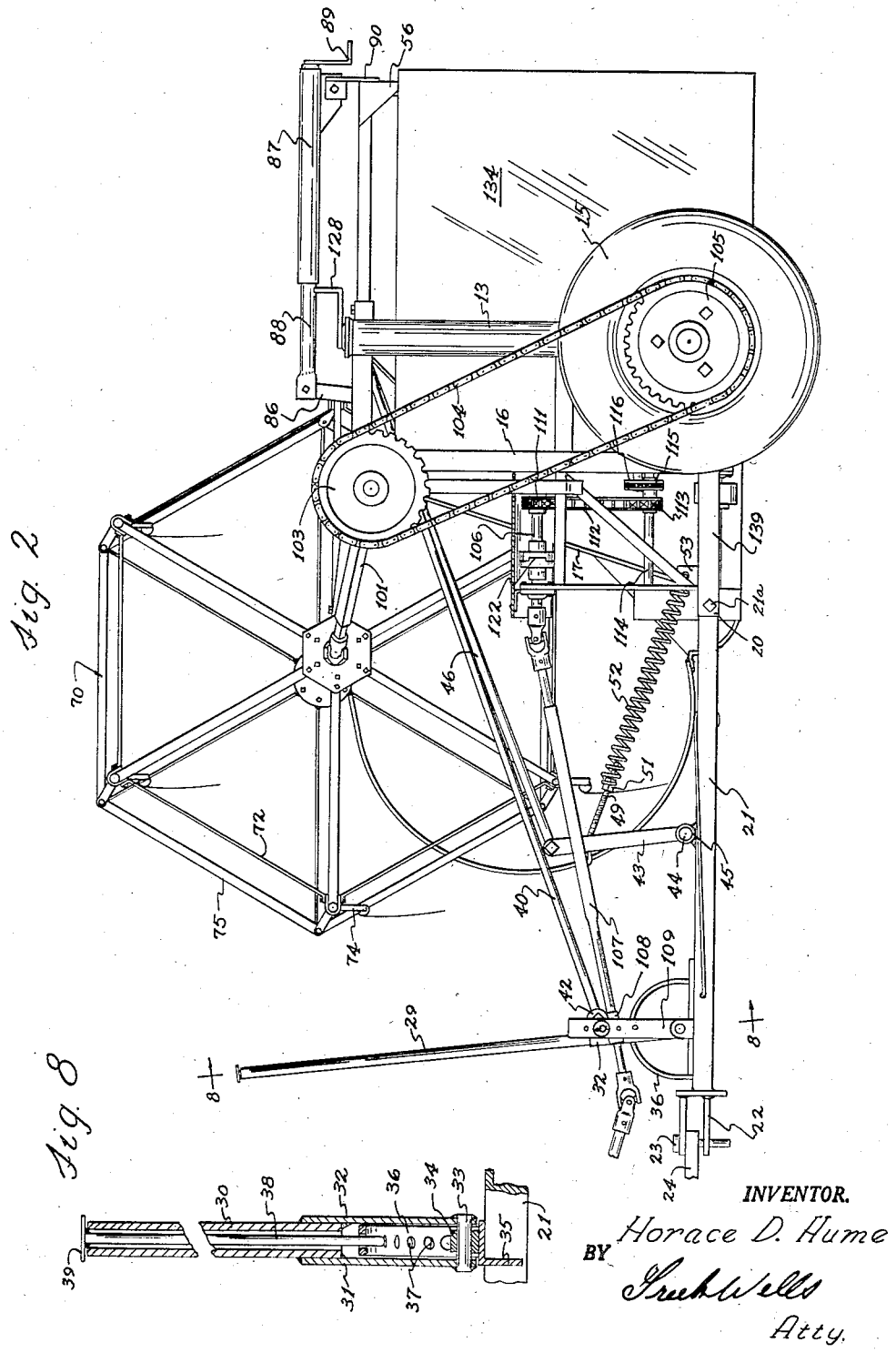
Figure 2 is an enlarged left side elevation view of the machine.
Figure 3:
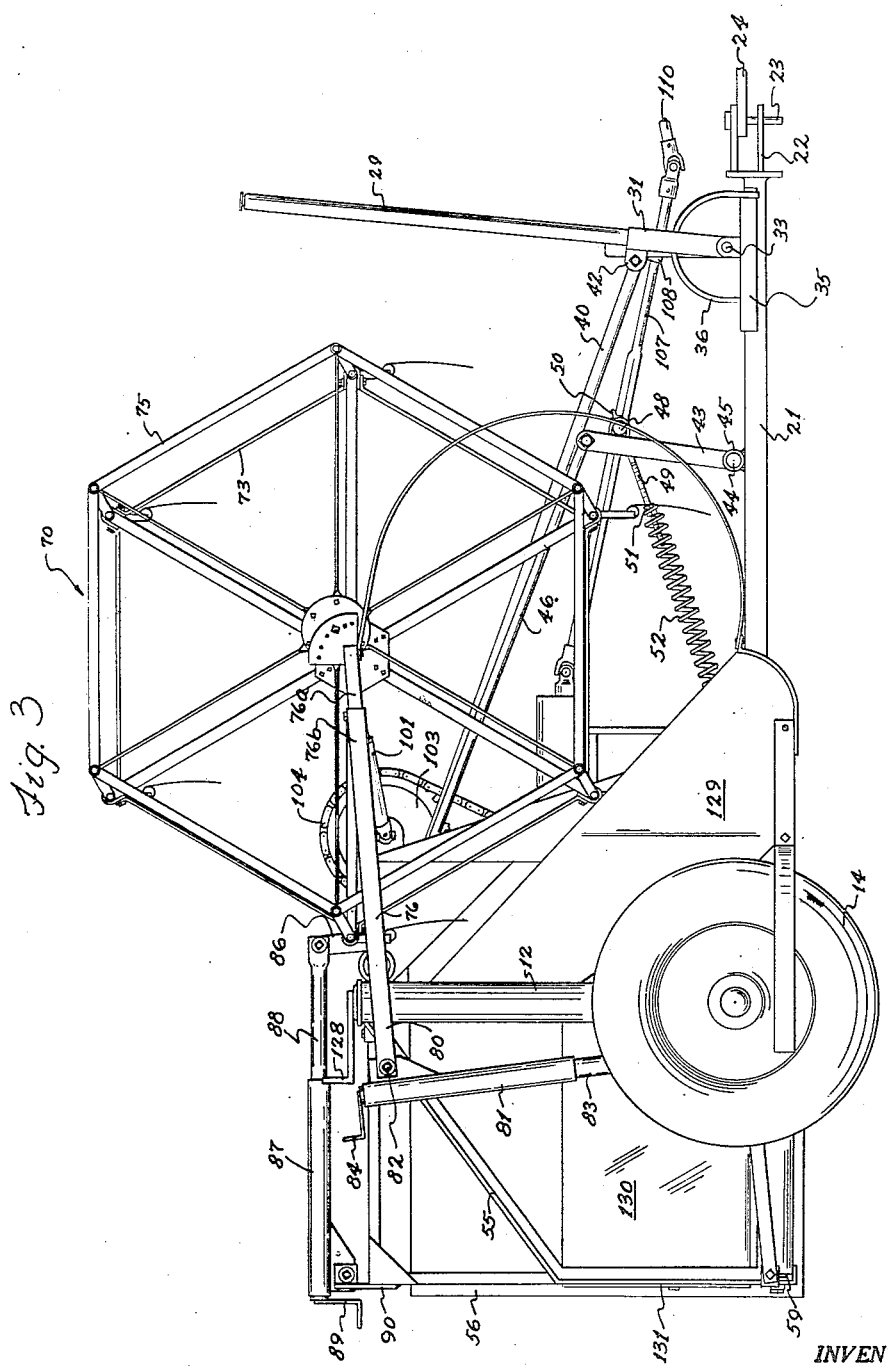
Figure 3 is an enlarged right side elevation view.
Figure 4:
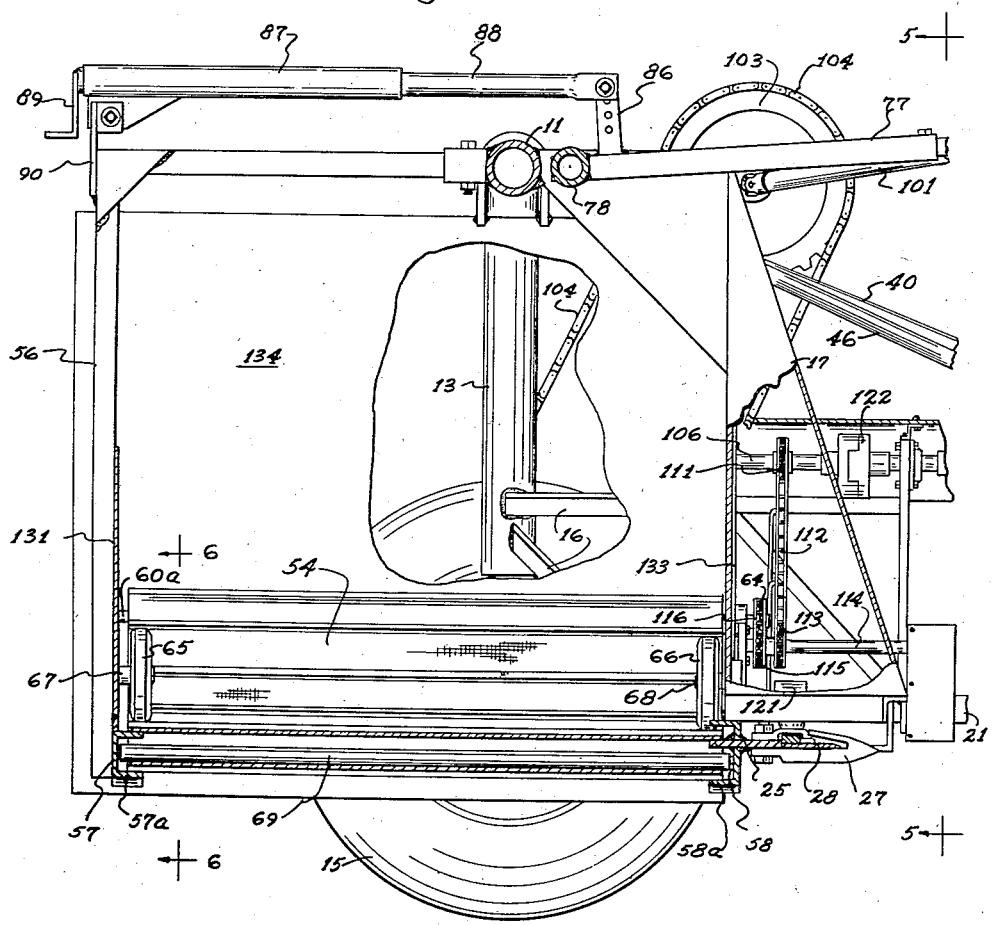
Figure 4 is an enlarged sectional view taken substantially on the line 4—4 of Figure 1 with certain parts broken away.
Figure 5:
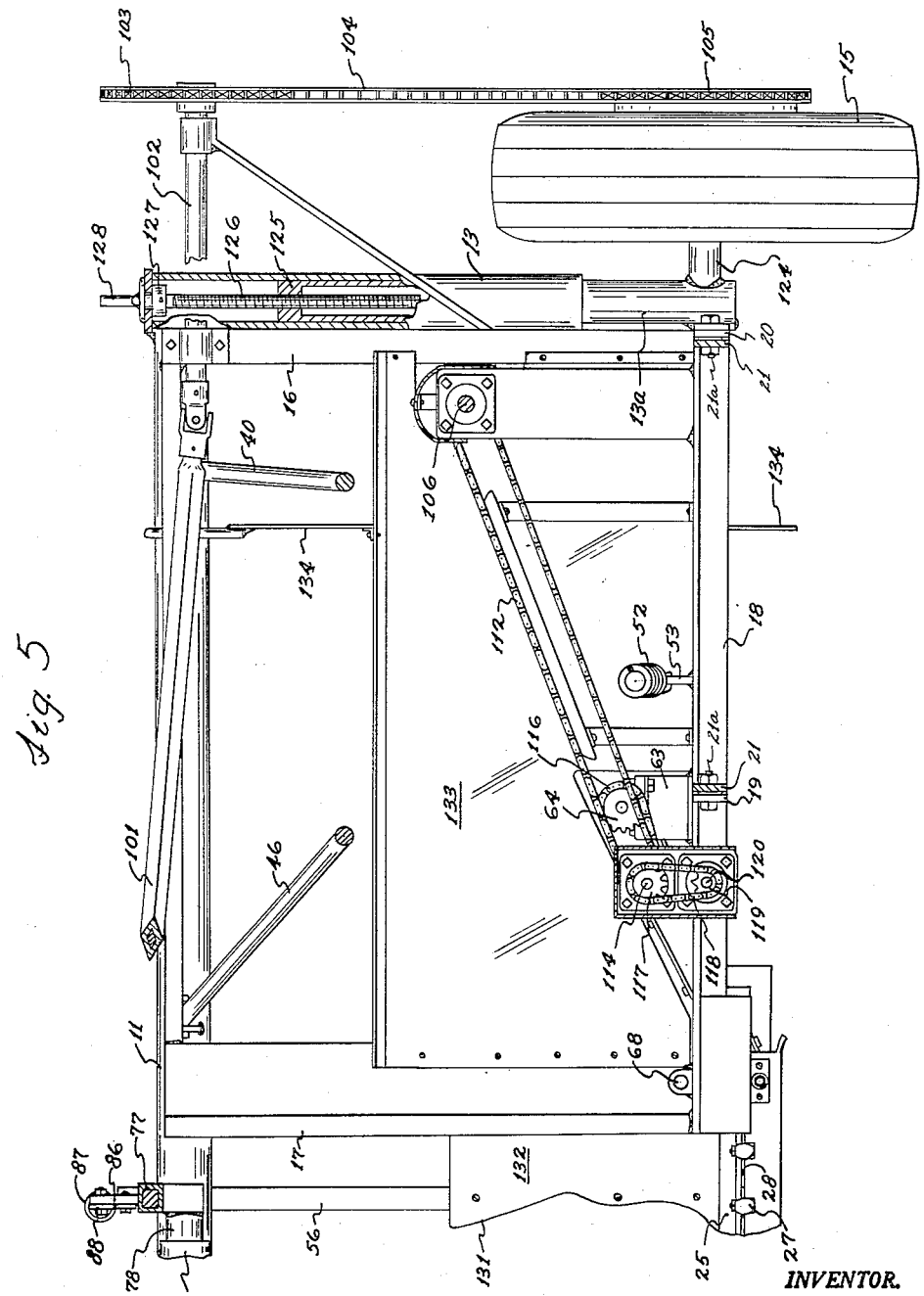
Figure 5 is a sectional view taken on the line 5—5 of Figure 4 with certain parts broken away.

Referring now to the drawings and to Figures 1, 2, and 3 in particular, my machine is shown as being supported from an upright inverted U-shaped main frame 10. The main frame 10 comprises a tubular transversely extending portion 11 with vertical wheel supporting posts 12 and 13 attached thereto at each end. Wheels 14 and 15, attached to the posts 12 and 13, support the frame for movement along the ground. Attached to the post 13 is a forwardly extending upright frame 16. Spaced inwardly toward the center of the main frame 10 and connected thereto is a second forwardly extending upright frame 17, best shown in Figures 4 and 5. The frames 16 and 17 support between them at their lower ends, a horizontal sub-frame 18. The sub-frame 18 supports at its forward edge two spaced apart ears 19 and 20. A forwardly extending towing frame 21 is pivoted by bolts 21a to the ears 19 and 20. A clevis 22 and pin 23 are secured to the front of the towing frame for connection to a draw bar 24 attached to the towing vehicle (not shown).

A cutter bar 25 is positioned below and in front of the main frame 10. The cutter bar 25 is supported at one end by the vertical frame 17 and is supported at the other end by a forwardly and downwardly extending angle iron 26 attached to the supporting post 12 (best shown in Figures 7 and 9). The cutter bar 25 supports the usual sickle guards 27 and sickle 28 which comprises a standard crop cutting mechanism.

Now since the tow frame 21 is not rigidly connected to the horizontal sub-frame 18, but is pivotally secured to the ears 19 and 20, it is possible for the main frame 10 to pivot forward and back about the wheels 14 and 15. Such pivotal action will lower and raise the cutter bar 25 with respect to the ground. In order to control this pivotal action and thereby adjust the cutting height, a control lever 29 is positioned at the front end of the tow frame 21. The lever 29 (see Figure 8) is formed of a pipe section 30 having legs 31 and 32 welded to its lower end. A pivot pin 33 fixed between the legs 31 and 32 is rotatably received by a bearing 34 secured to an angle iron 35 mounted on the tow frame 21. A semicircular strap 36 is also fixed to the angle iron 35 and is positioned between the legs 31 and 32. The strap 36 has a series of spaced apart holes 37 therein adapted to receive a stop pin 38. The pin 38 is positioned within the pipe section 30 and has a large washer 39 welded to its upper end. When it is desired to change the position of the lever 29, the stop pin 38 is lifted in the pipe section 30 by pressing upward on the washer 39. This removes the lower end of the pin 38 from the aperture 37 in the strap 36. The lever is then free to pivot about the pin 33. When the desired position of the lever is attained, the washer 39 is released and the pin 38 is free to drop into whichever aperture 37 is aligned with its position.

The function of the lever 29 is to control the height of the cutter bar 25. To accomplish this I provide a connecting bar 40, pivoted at one end to ears 41 carried by the transverse portion 11 of the frame 10, and pivoted at the other end to ears 42 fixed to the lever 29 intermediate its ends. With this construction, the frame 10 is held at whatever angular position is desired. A triangle is formed by the several parts, one leg being formed of the tow bar 21, a second leg formed by the lever 29 and connecting bar 40, and the third leg formed by the rigid frames 10 and 18. Moving the lever 29 corresponds to lengthening or shortening one leg of the triangle. If the lever 29 is moved away from the frame 10, the connecting bar pulls the transverse portion 11 forward, pivoting the frame 10 about the wheels 14 and 15 and moving the cutter bar 25 closer to the ground.

The major weight of the device rests in front of the wheel axis. Thus a considerable force is transmitted to the connecting bar 40 and the control lever 29. In order to relieve this force and balance the weight with respect to the tow frame 21, a spring balance structure is included. A vertical lever 43, is provided on the tow frame intermediate the clevis 22 and the rear end. The lever 43 is secured to a rod 44 which is rotatably mounted to the tow frame 21 by bearings 45. A push bar 46 is pivotally connected to the upper end of the lever 43 and extends rearwardly to the transverse portion 11 of the frame 10. Ears 47 secured to the portion 11 pivotally mount the push bar 46 thereon. A bearing member 48 pivotally mounted to the lever 43 below the push bar 46 rotatably receives a shaft 49. A head 50 on the shaft 49 bears against the member 48 and secures it thereto. The free end of the shaft 49 is threaded and receives a nut 51. A spring 52 is secured to the nut 51 as shown in Figures 2 and 3. The opposite end of the spring 52 is attached to an upstanding ear 53 fixed to the sub-frame 18. With the construction just described, the force exerted by the weight of the device tending to rock the frame 10 forward is transmitted through the push bar 46 to the lever 43. This force tends to pivot the lever 43 away from the frame 10. Now if the spring 52 is properly tensioned, it will resist the motion of the lever 43 and balance the weight. Such a balance removes all of the force from the connecting bar 40 and leaves the control lever 29 free to be easily moved to whatever adjustment is desired.

Figure 6:
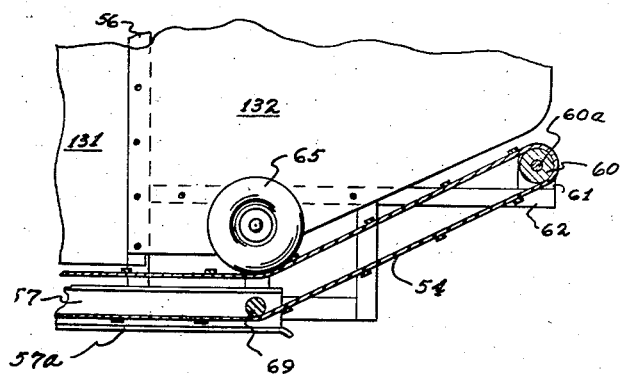
Figure 6 is a fragmentary sectional view taken on the line 6—6 of Figure 4.

Behind the cutter bar 25 and under the transverse portion 11 of the frame 10, a transverse draper 54 is positioned. A supporting brace 55, secured to the post 12 at the right side of the machine, and a second supporting brace 56, secured to the portion 11 of the frame 10 adjacent the vertical frame 17 (see Figure 4) support a transverse channel member 57 which extends parallel to the rear side of the draper 54. An angle iron 58, fixed to the underside of the cutter bar 25 extends parallel to the front side of the draper. A draper roller 59, rotatably mounted between the channel 57 and the angle iron 58 adjacent the post 12 supports the draper at that end. The lower flight of the draper 54 is positioned above the lower flange 57a of the channel 57 and the lower flange 58a of the angle iron 58 and is supported and guided thereby. The delivery or windrow forming end of the draper 54 at the left hand side of the machine is positioned somewhat above the opposite end to allow room for a windrow of cut crop to form beneath it. This end is supported by a drive roller 60 as seen in Figure 6. The end of the roller 60 at the rear of the machine is supported by a bearing 61 fixed to a frame member 62.

The member 62 is carried by the brace 56. The opposite end of the roller extends forwardly over the sub-frame 18 and is supported thereon by a bearing 63. The shaft 60a of the drive roller 60 extends through the bearing 63 and is provided with a drive sprocket 64. To keep the draper 54 taut and to maintain it in a level position for the length of the cutter bar, two wheels 65 and 66 are mounted at each side of the draper adjacent the brace 56 and the frame 17. The wheel 65 is rotatably secured to a stub shaft 67 mounted on the member 62 and the wheel 66 is mounted on a stub shaft 68 secured to the vertical frame 17. The wheels 65 and 66 are so positioned that the upper flight of the draper 54 must pass beneath them and then up to the drive roller 60. A small idler roller 69 is positioned between the channel 57 and the angle iron 58 directly below the wheels 65 and 66. The lower flight of the draper 54 is directed down from the drive roller 60, under this roller 69, and then between the members 57 and 58 to the roller 59 at the right hand side of the machine.

A harvesting reel 70, having a central shaft 71, end frames 72 and 73, and reel bats 74, is included on the machine above the cutter bar 25. An offset operating head 75 is provided on the reel to provide for supplementary rotary movement of the bats 74. The reel 70 is supported by reel arms 76 and 77 which extend forwardly of the main frame 10. The arms 76 and 77 are each formed of two telescoping sections 76a and 76b and 77a and 77b, so that the position of the reel 70 may be adjusted to suit cutting conditions. The arms 76 and 77 are fixed to a transverse shaft 78 which extends parallel to the portion 11 of the frame 10 and is positioned adjacent the portion 11 behind the reel 70. The shaft 78 is rotatably secured to the portion 11 by bearings 79. With this construction the reel 70 is free to pivot up and down about the shaft 78 as a center.

In order to support the reel 70 rigidly on the main frame 10, and yet provide for easy adjustment of its height above the cutter bar, extensible connecting means are employed between the arms 76 and 77 and the frame 10. The arm 76 has a portion 80 thereon extending rearwardly of the shaft 78 for a short distance. A jack 81 is pivoted by a pin 82 to the portion 80 as shown in Figures 3 and 7. The jack 81 has an extensible portion 83 therein which may be moved into and out of the jack 81 by a crank 84. The portion 83 is pivoted at its free end to a bracket 85 secured to the wheel post 12. The arm 77, at the opposite end of the reel 70, supports an upstanding lever 86 thereon a short distance in front of the shaft 78. A second jack 87, having an extensible portion 88 and a crank 89 is connected between the lever 86 and a bracket 90 fixed to the brace 56 on the main frame 10. It may be seen, that turning the cranks 84 and 89 will lengthen or shorten the jacks 81 and 87, thereby pivoting the arms 76 and 77 and raising or lowering the reel 70.

The reel 70 is driven from the left hand side by a universal drive shaft 101. The shaft 101 is connected through a universal joint to a second drive shaft 102 rotatably secured to the vertical frame 16. The shaft 102 carries a sprocket 103 at its outer end. The sprocket 103 is drivingly engaged through a chain 104 to a drive sprocket 105 secured to the hub of the wheel 15.

The sickle 26 and the draper 54, are driven from power transmitted from the towing vehicle. A drive shaft 106, rotatably mounted to the vertical side frame 16 receives power from a universal drive shaft 107 which extends forwardly over the towing frame 21. The universal drive shaft 107 is supported near the front of the tow frame 21 by a bearing 108 adjustably mounted to a bracket 109. A second universal drive shaft 110, connected to the power take-off of the towing vehicle is drivingly connected to the shaft 107 through a universal joint. The bearing 108 which supports the shaft 107 may be adjusted to the height necessary to accommodate the particular towing vehicle used. Rotation of the shaft 110 by the power take-off of the towing vehicle is transmitted through the shaft 107 to the shaft 106. A sprocket 111 mounted on the shaft 106 is drivingly connected by a chain 112 to a sprocket 113 fixed to a power shaft 114 rotatably mounted to the frame 18 near the vertical frame 17. A second sprocket 115 fixed to the shaft 114 is connected through a chain 116 to the sprocket 64 of the draper roller 60. At the forward end of the shaft 114, in front of the frame 18, a sprocket 117 is secured. This sprocket 117 connects through a chain 118 to a sickle drive sprocket 119. The sprocket 119 is mounted on a shaft 120 which is rotatably mounted in the frame 18 directly beneath the shaft 114. The shaft 120 has thereon an eccentric or crank drive which transforms the rotational motion of the shaft 120 to an oscillatory motion and transmits this to a pitman arm 121 which is connected to the sickle 26. Thus the rotational motion of the shaft 106 is transmitted through the chain 112 to the power shaft 114 and then through the chain 116 to the drive roller 60 of the draper 54. Rotational motion of the shaft 114 is also transmitted through the chain 118 to the sickle drive shaft 120. A friction or slip clutch 122 included in the drive shaft 106 protects the machinery in the event that the driven elements become overloaded.

In order to provide for adjustment of the height of the cutter bar 25 from the ground in addition to that obtained by tilting the frame 10, I provide the wheel supporting post 12 and 13 with extensible portions 12a and 13a. Wheel mounting spindles 123 and 124 are attached to the extensions 12a and 13a and serve to mount the wheels 14 and 15. Each of the extensions 12a and 13a extends into the post 12 or 13 and has an internally threaded cap 125 thereon. A threaded shaft 126 is received by the cap 125, and extends upwardly through the top of the post 12 or 13. A collar 127 fixed to the shaft 126 bears against the top of the post 12 or 13 and holds the extension 12a or 13a from slipping further into the post. A crank 128 fixed to the top of the shaft 126 may be used to turn the shaft and slide the extension 12a or 13a further into or out of the post 12 or 13 to adjust the height of the machine from the ground.

Metal shields 129, 130, 131, 132 and 133 are provided on the machine to guide the crop into the cutting mechanism and to confine the cut crop on the draper 54 as it travels toward the delivery end. A baffle plate 134, spaced a short distance away from the delivery end of the draper 54 assists in guiding the crop into a windrow as it falls from the draper 54.

In order to facilitate easy travel from field to field, I provide a novel method of adjusting my machine so that it may be pulled on the road at right angles to the direction of field travel. Excepting the tow frame, the machine is quite narrow, and, when pulled at right angles to the normal direction of travel, takes up much less room and may be easily trailed.

Figures 9, 10, and 11 illustrate the method by which the machine is adapted for road travel. First the right hand side of the machine is blocked up and the wheel 14 removed from the spindle 123. A draw bar 135 (shown in Figure 9), has a sleeve 136 adapted to fit over the spindle 123 and be secured thereto. Two other extensions 137 and 138 are provided on the draw bar and may be attached to the brace 26 and the cutter bar 25. When a towing vehicle is attached to the draw bar 135, it provides support for the end of the machine and the blocks may be removed.

On the left side of the machine the chain 104 connecting the sprocket 103 to the sprocket 105 on the wheel 16 is removed. A brace 139 which is normally attached between extension 13a of the post 13 and the vertical frame 16 to keep the extension 13a from pivoting during field travel is removed. The extension 13a is then free to rotate within the post 13 and is pivoted until the wheel 15 rests at 90 degrees to its original position. The wheel 14, removed from the other side of the machine, is then mounted on an auxiliary axle member 140, and the member 140 is bolted in place of the brace 139 (Figure 9 best shows this procedure). One of the bolts 21a which pivot the tow frame 21 to the machine serves to secure one end of the axle 140, and the other end is secured to the extension 13a of the post 13. When this process is completed, the wheels 14 and 15 are so aligned that the machine may be pulled at right angles to the original direction of travel.

In order to secure the tow frame 21 for road travel, it must be swung up out of the way against the frame of the machine. When the connecting rod 40 and the push bar 46 are disconnected from the ears 41 and the ears 47 on the frame portion 11, and when the spring 52 is disconnected from the lever 43, this may be accomplished. A hook rod 141, attached to the tow frame 21 near the front thereof may be hooked to the vertical frame 16 when the tow frame 21 has been raised to secure it in that position. (Figure 10 shows the machine adapted for road travel.)

It is believed that the machine described herein provides a useful and economical crop cutter and windrower. The machine is so balanced against the towing frame that the adjustment of the height and angle of the cutter bar may be made easily and quickly. The vertical U-shaped main frame 10 provides rigidity and support but is lightweight and economical to manufacture. The reel 70 is rigidly supported on the frame 10 and may readily be adjusted to any desired height. The method of adapting the machine for road travel permits the machine to be so constructed as to cut a wide swath in the field, and yet take up little more highway space than an automobile.

It is believed that the nature and advantages of my invention appear clearly from the foregoing description.

Having thus described my invention, I claim:

1. In a crop cutting and windrowing machine comprising a vertical U shaped main frame formed of a transverse horizontal section having depending legs fixed thereto at each end, wheels mounted at the lower ends of said legs, a cutting mechanism supported on said frame forward of said wheels and below said transverse horizontal section, a harvester reel carried on said frame above the cutting mechanism, a transverse draper carried on said frame behind the cutting mechanism whereby to move the cut crops to one side of the machine, and a tow frame secured to one end of the main frame, the improvement for mounting the tow frame comprising a pair of spaced apart forwardly extending vertical frames secured to one end of said main frame, a horizontal sub-frame supported between said spaced apart frames at the lower ends thereof, said tow frame pivotally connected to said sub-frame, a control lever pivoted to the tow frame near the front thereof, a connecting bar pivoted to the control lever and extending rearwardly, the opposite end of said bar being pivoted to the horizontal section of the main frame, whereby movement of the control lever will cause tipping of the main frame about the wheels, a second lever pivoted to the tow frame, a push bar having one end pivoted to the top of said second lever and having the other end pivoted to the horizontal section of the main frame, and a spring under tension connected to said second lever and having its opposite end connected to said sub-frame, whereby to balance the weight of the machine against the tow frame.

2. In a crop cutting and windrowing machine comprising a vertical U shaped main frame formed of a transverse horizontal section having depending legs fixed thereto at each end, wheels mounted at the lower ends of said legs, a cutting mechanism supported on said frame forward of said wheels and below said transverse horizontal section, a harvester reel carried on said frame above the cutting mechanism, a transverse draper carried on said frame behind the cutting mechanism whereby to move the cut crops to one side of the machine, and a tow frame secured to one end of the main frame, the improvement for mounting the tow frame comprising pivot members connecting said tow frame to said main frame below the transverse horizontal section thereof, a control lever pivoted to the tow frame, a connecting bar having one end pivoted to the control lever and having the other end pivoted to the transverse horizontal section of the main frame whereby movement of the control lever will cause tipping of the main frame about the wheels, a second lever pivoted to the tow frame, a push bar having one end pivoted to said second lever and having the other end pivoted to the transverse horizontal section of the main frame, and a spring under tension having one end connected to said second lever and having the other end connected to the main frame below the transverse horizontal section whereby to balance the weight of the main frame against the tow frame.

3. A crop cutting and windrowing machine comprising a vertical U-shaped main frame having a transverse horizontal section and having depending legs fixed to said transverse section at the ends thereof, a supporting wheel rotatably mounted on each of said depending legs, a sub frame attached to said main frame, a tow frame pivoted to said sub frame and extending forwardly therefrom, manually adjustable means connected between the tow frame and the main frame and operable to maintain the tow frame in adjusted angular relation with the main frame, a cutting mechanism supported on said main frame, a harvester reel supported on said main frame above the cutting mechanism, and a transverse draper carried on the main frame behind the cutting mechanism.

4. A crop cutting and windrowing machine comprising a vertical U-shaped main frame having a transverse horizontal section and having depending legs fixed to said transverse section at the ends thereof, a supporting wheel rotatably mounted on each of said depending legs, a sub frame attached to said main frame, a tow frame pivoted to said sub frame and extending forwardly therefrom, a control lever pivoted to the tow frame, a connecting bar having one end pivoted to the control lever and having the other end pivoted to the transverse horizontal section of the main frame whereby movement of the control lever will cause angular adjustment of the tow frame with respect to the main frame, and spring counterbalancing means connected between the tow frame and the main frame tending to pivot the tow frame downwardly with respect to the main frame.

5. In a crop cutting and windrowing machine comprising a main frame, wheels supporting said frame, a cutting mechanism supported on said frame in front of the wheels, a harvester reel supported on said frame above the cutting mechanism, a transverse draper supported on said frame behind the cutting mechanism, and a tow frame secured to said main frame, the improvement for mounting the tow frame comprising pivot members connecting the tow frame to the main frame, a control lever pivoted to the tow frame, a connecting bar having one end pivoted to the control lever and having the other end pivoted to the main frame above the level of the pivot members whereby movement of the control lever will cause angular adjustment of the tow frame with respect to the main frame, and spring counterbalancing means connected between the tow frame and the main frame tending to pivot the tow frame downwardly with respect to the main frame.

6. In a crop cutting and windrowing machine comprising a main frame, wheels supporting said frame, a cutting mechanism supported on said frame in front of the wheels, a harvester reel supported on said frame above the cutting mechanism, a transverse draper supported on said frame behind the cutting mechanism, and a tow frame secured to said main frame, the improvement for mounting the tow frame comprising pivot members connecting the tow frame to the main frame, a control lever pivoted to the tow frame, a connecting bar having one end pivoted to the control lever and having the other end pivoted to the main frame above the level of the pivot members whereby movement of the control lever will cause angular adjustment of the tow frame with respect to the main frame, a second lever pivoted to the tow frame, a push bar having one end pivoted to said second lever and having the other end pivoted to the main frame above the level of the pivot members, and a spring under tension having one end connected to said second lever and having the other end connected to the main frame whereby to balance the weight of the main frame against the tow frame.

References Cited in the file of this patent

UNITED STATES PATENTS

| | | |
|---|---|---|
| 2,239,926 | Millard | Apr. 29, 1941 |
| 2,282,567 | Ellefson | May 12, 1942 |
| 2,352,479 | Huddle | June 27, 1944 |
| 2,354,962 | Oehler et al. | Aug. 1, 1944 |
| 2,395,672 | Kranick et el. | Feb. 26, 1946 |
| 2,492,223 | Jenson | Dec. 27, 1949 |
| 2,644,287 | Oberholtz | July 7, 1953 |
| 2,662,362 | Beasley | Dec. 15, 1953 |